United States Patent
Hügler et al.

(10) Patent No.: US 12,546,642 B2
(45) Date of Patent: Feb. 10, 2026

(54) ANGLE-RESOLVING FILL-LEVEL MEASURING DEVICE

(71) Applicant: Endress+Hauser SE+Co. KG, Maulburg (DE)

(72) Inventors: Philipp Hügler, Aalen (DE); Winfried Mayer, Buch (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 455 days.

(21) Appl. No.: 18/245,213

(22) PCT Filed: Aug. 16, 2021

(86) PCT No.: PCT/EP2021/072677
§ 371 (c)(1),
(2) Date: Mar. 14, 2023

(87) PCT Pub. No.: WO2022/058102
PCT Pub. Date: Mar. 24, 2022

(65) Prior Publication Data
US 2024/0019290 A1  Jan. 18, 2024

(30) Foreign Application Priority Data
Sep. 17, 2020 (DE) .................... 10 2020 124 300.6

(51) Int. Cl.
*G01F 23/284* (2006.01)
*G01F 23/80* (2022.01)
(Continued)

(52) U.S. Cl.
CPC .......... *G01F 23/804* (2022.01); *G01F 23/284* (2013.01); *H01Q 1/225* (2013.01)

(58) Field of Classification Search
CPC .. G01F 23/284; G01F 23/804; G01F 23/2962; G01F 23/28; G01S 13/003;
(Continued)

(56) References Cited

U.S. PATENT DOCUMENTS

| | | | |
|---|---|---|---|
| 11,870,138 B2* | 1/2024 | Loesch | H01Q 23/00 |
| 11,953,615 B2* | 4/2024 | Ali | G01S 13/584 |

(Continued)

FOREIGN PATENT DOCUMENTS

| | | |
|---|---|---|
| CN | 101278441 A1 | 10/2008 |
| CN | 104375122 A1 | 2/2015 |

(Continued)

*Primary Examiner* — Jeffrey P Aiello
(74) *Attorney, Agent, or Firm* — Mark A. Logan; Endress+Hauser (USA) Holding, Inc.

(57) ABSTRACT

A radar-based fill-level measuring device for determining a three-dimensional fill-level profile by the MIMO principle comprises an antenna assembly which comprises a sub-antenna array in addition to a main antenna array. Angle-separating solid-angle spectra can be created by means of the main antenna array, and these solid-angle spectra are combined with those of the sub-antenna array. Accordingly, the sub-antenna array is designed such that its solid-angle spectra permit a unique assignment of each solid angle in the entire solid-angle range. For this purpose, the corresponding antennas are arranged on an intermediate grid. The advantage of this is that with a total of very few antennas or a fast evaluation associated therewith over a wide solid-angle range a highly angle-separating fill-level profile can be captured.

13 Claims, 4 Drawing Sheets

(51) Int. Cl.
G01S 7/03 (2006.01)
G01S 13/34 (2006.01)
G01S 13/42 (2006.01)
G01S 13/88 (2006.01)
H01Q 1/22 (2006.01)
H01Q 1/28 (2006.01)
H01Q 21/22 (2006.01)

(58) Field of Classification Search
CPC .... G01S 13/343; G01S 13/345; G01S 13/342; G01S 13/88; G01S 13/89; G01S 7/003; G01S 7/282; G01S 7/4008; G01S 7/4004; G01S 3/02; G01S 11/12; H01Q 1/225; H01Q 21/28
USPC .......... 73/1.73; 342/124, 127, 126; 702/152, 702/154, 153, 155, 55, 188, 127, 166, 1, 702/150, 189, 79, 17, 183, 31, 140, 159, 702/167, 97
See application file for complete search history.

(56) References Cited

U.S. PATENT DOCUMENTS

| | | | |
|---|---|---|---|
| 2011/0193567 A1* | 8/2011 | Klofer | G01F 23/284 324/642 |
| 2014/0340259 A1 | 11/2014 | Fehrenbach et al. | |
| 2018/0102584 A1* | 4/2018 | Waelde | H01P 5/028 |

FOREIGN PATENT DOCUMENTS

| | | | | |
|---|---|---|---|---|
| CN | 107966704 A | * | 4/2018 | ........... G01S 7/4816 |
| CN | 107976671 A1 | | 5/2018 | |
| CN | 107991673 A1 | | 5/2018 | |
| CN | 109375174 A1 | | 2/2019 | |
| DE | 102005011778 A1 | | 9/2006 | |
| DE | 102008050329 A1 | * | 4/2010 | ......... G01F 23/2884 |
| DE | 102018207686 A1 | | 11/2019 | |
| EP | 3255392 A1 | | 12/2017 | |
| EP | 3309899 A1 | * | 4/2018 | ............. H01Q 13/02 |
| EP | 3559694 B1 | * | 3/2022 | ............. H01Q 13/10 |
| EP | 4214478 B1 | * | 10/2024 | ............. H01Q 1/225 |
| GB | 2059214 A1 | | 4/1981 | |
| WO | WO-2022038759 A1 | * | 2/2022 | ........... H01Q 21/061 |

* cited by examiner

ANGLE-RESOLVING FILL-LEVEL MEASURING DEVICE

CROSS-REFERENCE TO RELATED APPLICATIONS

The present application is related to and claims the priority benefit of DPMA Patent Application No. 10 2020 124 300.6, filed on Sep. 17, 2020, and International Patent Application No. PCT/EP2021/072677, filed Aug. 16, 2021, the entire contents of which are incorporated herein by reference.

TECHNICAL FIELD

The invention relates to an antenna assembly for a fill-level measuring device, which serves to determine a fill-level profile over a defined solid-angle range, and a method for operating the measuring device.

BACKGROUND

In process automation, corresponding field devices are used for capturing relevant process parameters. For the purpose of capturing the respective process parameters, suitable measuring principles are therefore implemented in the corresponding field devices, in order to capture as process parameters, for example a fill level, a flow, a pressure, a temperature, a pH value, a redox potential or a conductivity. A wide variety of such field devices is manufactured and distributed by the Endress+Hauser company.

For measuring the fill level of filling materials in containers, contactless measuring methods have become established, because they are robust and require minimum maintenance. Within the scope of the invention, the term "container" is also understood to mean containers that are not closed, such as basins, lakes, or flowing bodies of water. A further advantage of contactless measuring methods consists in the ability to be able to measure the fill level quasi-continuously. Radar-based measuring methods are therefore predominantly used in the field of continuous fill-level measurement (in the context of this patent application, "radar" refers to signals or electromagnetic waves with frequencies between 0.03 GHz and 300 GHz).

An established measurement method is FMCW ("frequency-modulated continuous wave"). The underlying measurement principle is based on transmitting a continuous radar signal with a modulated frequency. Characteristic of FMCW is that the transmission frequency is periodically changed within a defined frequency band. Taking into account regulatory requirements, higher frequency bands in the range of a standardized center frequency are widely used as development progresses. In addition to the 6 GHz band, the 26 GHz band or 79 GHz band, frequencies above 100 GHz have now in the meantime been implemented. An advantage of high frequencies is that at higher frequencies a greater absolute bandwidth (for example, 4 GHz in the 100 GHz frequency band) can be used. As a result, a higher resolution or a higher accuracy of fill-level measurement is again achieved.

The change in frequency over time within the frequency band is linear by default, and has a sawtooth or triangular shape. In principle, a sinusoidal change can also be implemented. In the FMCW method, the distance or the fill level is determined on the basis of the instantaneous frequency difference between the radar signal currently received after reflection at the measurement object, and the radar signal currently transmitted by the measuring device. The FMCW-based fill-level measuring method is described, for example, in published patent application DE 10 2013 108 490 A1.

By means of the FMCW method, it is possible to measure distance or fill level at least selectively. In this case, the point at which the fill level is measured is guided by the orientation of the transmitting/receiving antenna or by the direction of its beam lobe (due to the generally reciprocal properties of antennas, the characteristic or the beam angle of the beam lobe of the respective antenna is independent of whether it is transmitting or receiving; in the context of the present patent application, the term "angle" or "beam angle" refers to the angle at which the beam lobe has its maximum transmission intensity or reception sensitivity).

In the case of liquid filling materials whose fill level is homogeneous, a selective fill-level measurement suffices. In these cases, the fill-level measuring device is oriented in such a way that the beam lobe of the antenna is directed approximately vertically downwards, and the distance to the filling material determined. In the case of solid-like filling materials, such as gravel or grain, the fill level can, for example, be inhomogeneous due to bulk material cones, so that the fill-level value determined by the fill-level measuring device is only meaningful to a limited extent. Especially in such cases, it is therefore desirable to be able to determine the distance or the fill level in the form of a two- or three-dimensional profile.

For this to be possible, the fill-level measuring device must be designed to be able to assign incoming radar signals to an associated solid angle. This can be achieved, for example, by means of the MIMO principle ("multiple input multiple output"). This principle is based on an antenna assembly consisting of a plurality of transmitting and receiving antennas. In this case, each transmitting antenna transmits a radar signal orthogonal to the other transmitting antenna, which is received by each receiving antenna and optionally digitized in order to then undergo a common radar signal processing. From an antenna assembly of N transmitting antennas and K receiving antennas, a virtual antenna arrangement of K*N antennas with a greatly enlarged virtual aperture is thus mathematically created. The corresponding evaluation unit must be able to digitize the radar signals received in each case via the K receiving antennas or to process them by signal technology and to create corresponding K*N measurement curves via the orthogonality of the transmission signals. As a result, MIMO-based radar systems increase the spatial resolution capability compared to systems without a virtually enlarged aperture and achieve a significantly improved immunity to interference.

If all transmitting and receiving antennas are arranged at approximately the same location or common substrate so that they cover the same solid-angle range, this is referred to as "co-located MIMO." In one possible embodiment thereof, the transmitting antennas are arranged in a column, while the receiving antennas are arranged within the antenna assembly in a row. The transmitting and receiving antennas are therefore each arranged at a defined separating distance along a straight line, wherein the straight lines run approximately at right angles to one another and thus span a grid with K*N points, which grid represents the locations of the virtual antennas. In order to be able to assign the resulting measurement curves to the individual points or to the individual antennas, various techniques are known for controlling the transmitting antennas or for evaluating the receiving antennas. In this regard, preferably "TDMA (time-division multiple access)" is implemented, according to which the transmitting antennas are activated one after the other along their arrangement in accordance with the time-division multiplexing method.

According to the prior art, the entire hardware required for implementing the MIMO principle can already be integrated so compactly that the transmitting and receiving antennas are accommodated as patch antennas on a common printed circuit board or even as a jointly encapsulated IC ("integrated circuit") together with that semiconductor component which comprises the signal generation unit and the evaluation unit. MIMO-based radar systems are described in more detail, for example, in "MIMO radar signal processing" (Jian Li), 2009.

A necessary condition of an unambiguous, solid-angle-dependent fill-level measurement is for the individual transmitting and receiving antennas to be lined up within the antenna assembly or along the straight line with a separating distance equal to or less than half the wavelength of the radar signal. Otherwise, in addition to the main emission lobe, so-called "grating lobes" will arise. These are secondary beam lobes which, in contrast to side lobes, have a beam intensity equal to the intensity of the primary beam lobe. If then the transmitting or receiving antennas are further spaced apart from one another than half of the wavelength of the radar signal, the angle at which a possible object causes a radar echo signal will no longer be unambiguously assignable due to the grating lobe within the solid-angle range.

In the event that in turn the number of transmitting and receiving antennas is limited, for example, due to the evaluation unit having a limited number of evaluation channels, it is possible in the case of a close arrangement of the antennas—in other words, when the antenna separating distance is less than half the wavelength—that sufficient angular separation will not be achievable, depending on the width of the desired solid-angle range.

SUMMARY

It is accordingly an object of the invention to provide a fill-level measuring device with which a fill-level profile with high angular separation can be captured over a large solid-angle range even in the case of few evaluation channels being available.

The invention achieves this object by a corresponding antenna assembly for a radar-based fill-level measuring device, which serves to determine a fill-level profile of a filling material over a defined solid-angle range. For this purpose, the antenna assembly according to the invention comprises a main antenna array with at least two transmitting antennas arranged along a first straight line, by means of which a radar signal with a defined wavelength can be transmitted in the direction of the filling material in accordance with the MIMO principle. Thereby, the transmitting antennas of the main antenna array are arranged at a defined first separating distance from one another, which is greater than half the wavelength of the radar signal. In addition to the transmitting antennas, the main antenna array has at least two receiving antennas arranged along a second straight line, by means of which the radar signal reflected by the filling material surface can be received. Thereby, the receiving antennas are arranged at a second defined separating distance from one another, which in turn is greater than half the wavelength of the radar signal. In addition, the second straight line is arranged at a defined angle of in particular 90° to the first straight line, so that the transmitting antennas and the receiving antennas form a corresponding grid.

Due to the separating distances between the transmitting and receiving antennas in the main antenna array, which are in each case greater than half the wavelength of the radar signal, the main antenna array can with a small number of transmitting and receiving antennas indeed effect a high angular separation over a large solid-angle range of at most 180° or 2*π, but not necessarily every solid angle in the defined solid-angle range can be unambiguously assigned by means of the main antenna array. According to the invention, the antenna assembly therefore additionally comprises, in addition to the main antenna array, a sub-antenna array with at least two independent transmitting or receiving antennas, which in turn are designed to transmit the radar signal or to receive it after reflection at the filling material surface.

The at least two independent receiving or transmitting antennas of the sub-antenna array are arranged on an intermediate grid in relation to the grid of the main antenna array in such a way that at least one transmitting antenna (or receiving antenna, if the sub-antenna array has two or more transmitting antennas as independent antennas) is assigned in such a way that, by means of the sub-antenna array in the defined solid-angle range, each solid angle can be unambiguously assigned.

The at least one assigned antenna of the sub-antenna array can be one of the transmitting or receiving antennas of the main antenna array. Alternatively or additionally, the sub-antenna array can as an assigned antenna comprise at least one separate transmitting or receiving antenna arranged on the intermediate grid.

Due to the design of the antenna assembly according to the invention with two antenna arrays, corresponding measurement curves can be recorded in each case separately by means of the main and sub-antenna arrays according to the MIMO principle and separate solid-angle spectra for each of the two antenna arrays can be created therefrom. This makes it possible according to the invention for the corresponding solid-angle spectra of the main antenna array and the sub-antenna array to be combined to form conjugated solid-angle spectra, in order to create a solid-angle-dependent fill-level profile on the basis of the conjugated solid-angle spectra. An advantage of this is that thanks to the main antenna array the conjugated solid-angle spectra have a high angular separation over the entire solid-angle range of up to 180° and that thanks to the sub-antenna array, each solid angle within the conjugated solid-angle spectrum can at the same time be unambiguously assigned. In comparison with an antenna assembly, which according to the prior art consists of only of one antenna array whose antennas are arranged at a distance of less than or equal to $\lambda/2$, the same solid-angle range and the same angular separation can be realized with a significantly reduced number of antennas or evaluation channels by means of the antenna assembly according to the invention.

The design of the transmitting and receiving antennas of the main antenna array and of the sub-antenna array are not fixedly predefined within the scope of the invention. They can be designed not only as planar, for example as patch antennas on a corresponding substrate, but can also be designed as waveguide antennas, for example.

Specifically, the grid of the main antenna array, i.e. the respective separating distance between the transmitting antennas and the respective separating distance between the receiving antennas can, for example, be dimensioned within the scope of the invention such that the first separating distance and the second separating distance correspond in each case to the wavelength of the radar signal. In this case, the offset of the independent transmitting or receiving antennas of the sub-antenna array has to be half the wavelength of the radar signal, so that the independent transmitting or receiving antennas of the sub-antenna array are arranged on the corresponding intermediate grid in relation to the grid of the main antenna array.

In order to be able to map a symmetrical solid-angle range, the main antenna array is preferably to be designed such that it has an identical number of transmitting antennas and receiving antennas. With regard to the number of independent transmitting or receiving antennas of the sub-antennas, it will be sufficient, depending on the number of antennas in the main antenna array, if the sub-antenna array has at most half, in particular only a third, of the transmitting or receiving antennas, compared to the main antenna array, so that the total number of antennas in the two antenna arrays can also be kept within limits. As a result, the antenna assembly according to the invention can also be evaluated by such evaluation units, which can provide only a limited number of channels simultaneously for evaluating the antennas.

On the basis of the antenna assembly according to the invention, a radar-based fill-level measuring device can be realized by means of which a fill-level profile of a filling material surface can be determined with high angular separation over a wide solid-angle range. In addition to the antenna assembly according to one of the previously described embodiment variants, the fill-level measuring device correspondingly comprises the following components:

A signal generation unit, which is designed to generate a radar signal with a defined wavelength and to couple it into the transmitting antennas of the main antenna array and of the sub-antenna array in accordance with the MIMO principle (i.e. either individually coded or on the basis of TDMA for each subsequent transmitting antenna one after the other), and an evaluation unit, which is designed to in accordance with the MIMO principle, capture corresponding measurement curves based on the radar signals received at the main antenna array, in accordance with the MIMO principle, capture corresponding measurement curves based on the radar signal received at the sub-antenna array, in order to create corresponding solid-angle spectra on the basis of the measurement curves captured by means of the main antenna array at the level of defined measuring points of the measurement region, in order to create corresponding solid-angle spectra on the basis of the measurement curves capture by means of the sub-antenna array at the level of the defined measuring points of the measurement region, in order to combine the solid-angle spectra of the main antenna array and of the sub-antenna array into conjugated solid-angle spectra corresponding to the measurement points, and in order to create the solid angle-dependent fill-level profile on the basis of the conjugated solid-angle spectra.

Within the scope of the invention, the term "unit" in principle refers to any electronic circuit that is designed to be suitable for the intended purpose. Depending on the requirement, it may therefore be an analog circuit for generating or processing corresponding analog signals. However, it may also be a digital circuit, such as an FPGA, or a storage medium in interaction with a program. In this case, the program is designed to perform the corresponding method steps or to apply the necessary calculation operations of the respective unit. In this context, various electronic units of the measuring device in the sense of the invention can potentially also access a common physical memory or be operated by means of the same physical digital circuit.

Within the scope of the invention, it is not firmly prescribed which basic radar method must be implemented for creating the individual measurement curves. In principle, for example, the FMCW or the pulse transit-time method can be used. In the case of the FMCW method, the signal generation unit of the fill-level measuring device is to be designed such that it can generate the radar signal according to the FMCW method with a corresponding frequency ramp. With FMCW, the evaluation unit should accordingly be designed such that the measuring curves of the main antenna array and of the sub-antenna array are created according to the FMCW method by Fourier transform of the received radar signal. In the case of FMCW, the evaluation unit can also preferably weight the Fourier-transformed measurement curves of the main antenna array and of the sub-antenna array preferably by means of a window function, in particular by means of a Hann window or a Chebychev window, in order to suppress interference echoes from the edge of the measurement range.

Corresponding to the fill-level measurement device according to the invention, the object on which the invention is based is also achieved by a corresponding measurement method for operating the fill-level measurement device. Accordingly, the method comprises at least the following method steps:

Capturing corresponding measurement curves over a defined fill-level measurement range by means of the main antenna array according to the MIMO principle, Creating solid-angle spectra at the level of a plurality of defined measuring points of the measurement range on the basis of the measurement curves captured by means of the main antenna array, Capturing corresponding measurement curves over a defined fill-level measurement range by means of the sub-antenna array according to the MIMO principle, Creating solid-angle spectra at the level of the defined measuring points of the measurement range on the basis of the measurement curves captured by means of the sub-antenna array, Combining the solid-angle spectra, corresponding to the measurement points, of the main antenna array and of the sub-antenna array into conjugated solid-angle spectra, and Creating the solid-angle-dependent fill-level profile on the basis of the conjugated solid-angle spectra.

If the solid-angle spectra are each logarithmically scaled, the solid-angle spectra of the main antenna array and of the sub-array corresponding to the measurement points are combined by addition. If the solid-angle spectra are each linearly scaled, the solid-angle spectra of the main antenna array and of the sub-antenna array corresponding to the measurement points will need to be combined by multiplication. The solid-angle spectra can be created on the basis of any digital beamforming method ("digital beamforming").

The invention is explained in more detail with reference to the following figures. The following are shown.

BRIEF DESCRIPTION OF THE DRAWINGS

DETAILED DESCRIPTION

Figure 1:
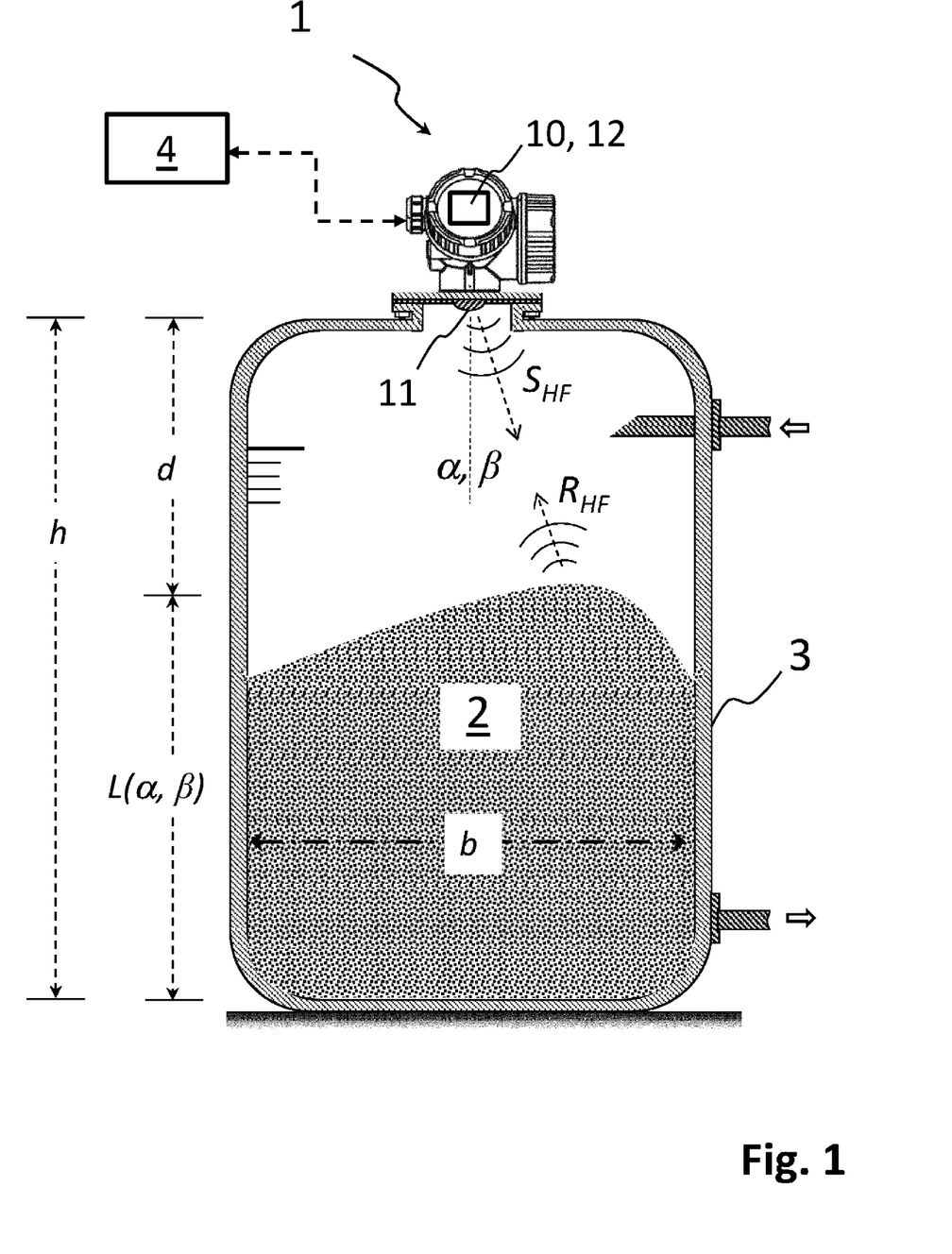
FIG. 1 shows a radar-based fill-level measuring device on a container.

For an understanding of the invention, FIG. 1 shows a container 3 with a filling material 2, the fill level L of which is to be captured in the form of a three-dimensional fill-level profile L(a, T. For this purpose, the fill-level measuring device 1 is mounted on the container 3 at a known installation height h above the filling material 2. In this case, the container 3 can be up to more than 100 m high, depending on the type and field of application. The fill-level measuring device 1 is aligned with and fastened to the container 3 in such a way that it continuously, cyclically or also acyclically emits a radar signal S H E with a corresponding wavelength A in the direction of the surface of the filling material 2, doing so via an antenna assembly 11. After reflection of the radar signal $S_{HF}$ at the filling material surface, the fill-level measuring device 1 receives the reflected radar signal $R_{HF}$ via the antenna assembly 11 as a function of the separating distance d between the fill-level measuring device 1 and the filling material surface according to $$d=h-L$$

As a rule, the fill-level measuring device 1 is connected via an interface, such as "PROFIBUS", "HART" or "Wireless HART", to a higher-level unit 4, such as a process control system. In this way, the fill-level value L can be transmitted, for example in order to control if necessary any inflows or outflows of the container 3. However, other information about the general operating state of the fill-level measuring device 1 can also be communicated.

According to the prior art, it is already possible by means of corresponding radar methods such as FMCW or the pulse transit-time method to resolve the fill level L under ideal conditions (highly reflective filling material 2, planar filling material surface, no obstacles such as agitators or other fittings in the signal path of the radar signal $S_{HF}$), doing so selectively with an accuracy in the sub-micrometer range. Even with rough or wavy filling-material surfaces or a dusty atmosphere, a reliable measurement of the fill level L at a point on the filling material surface is possible by means of the FMCW method.

However, the selective measurement of the fill level L comes up against its limits when the surface of the filling material 2, as shown in FIG. 1, is not planar. This can occur in particular in the case of bulk-type filling materials 2, for example when bulk cones form during filling of the container 3. In addition, when the filling material 2 is being pumped out, conic depressions can occur on the filling material surface. If the fill-level measuring device 1 were to determine the fill level L only selectively at one point on the surface of the filling material 2, this could lead to an incorrect interpretation of the fill level L. For example, an emptying process could be stopped when an empty container 3 has been detected by the radar module 1, even though filling material 2 is still present at the edge of the container interior. In the opposite case, when the container 3 is full, it could happen that a filling process is not stopped even though a maximum filling level at one location on the filling material surface has already been exceeded, because this has not been detected by the fill-level measuring device 1.

For this reason, the fill-level measuring device 1 according to the invention is, as indicated in FIG. 1, capable of determining the fill level L within a defined solid-angle range [α; β] in the form of a three-dimensional fill-level profile L(α, β). In this case, the angles α, β of the solid-angle range [α; β], which extend perpendicular to one another, relate in each case to the plumb line. Accordingly, the fill-level profile L(α, β) is created in relation to a polar coordinate system. To create a three-dimensional fill-level profile L(x, y) in the Cartesian coordinate system, the respective angle α, β (since this is known, as is also the respectively measured distance d(α, β)) can be converted by means of the sine function to form a corresponding lateral value x, y which stands in relation to the container cross-section. A corresponding conversion from a polar coordinate system into a Cartesian coordinate system therefore takes place.

Figure 2:
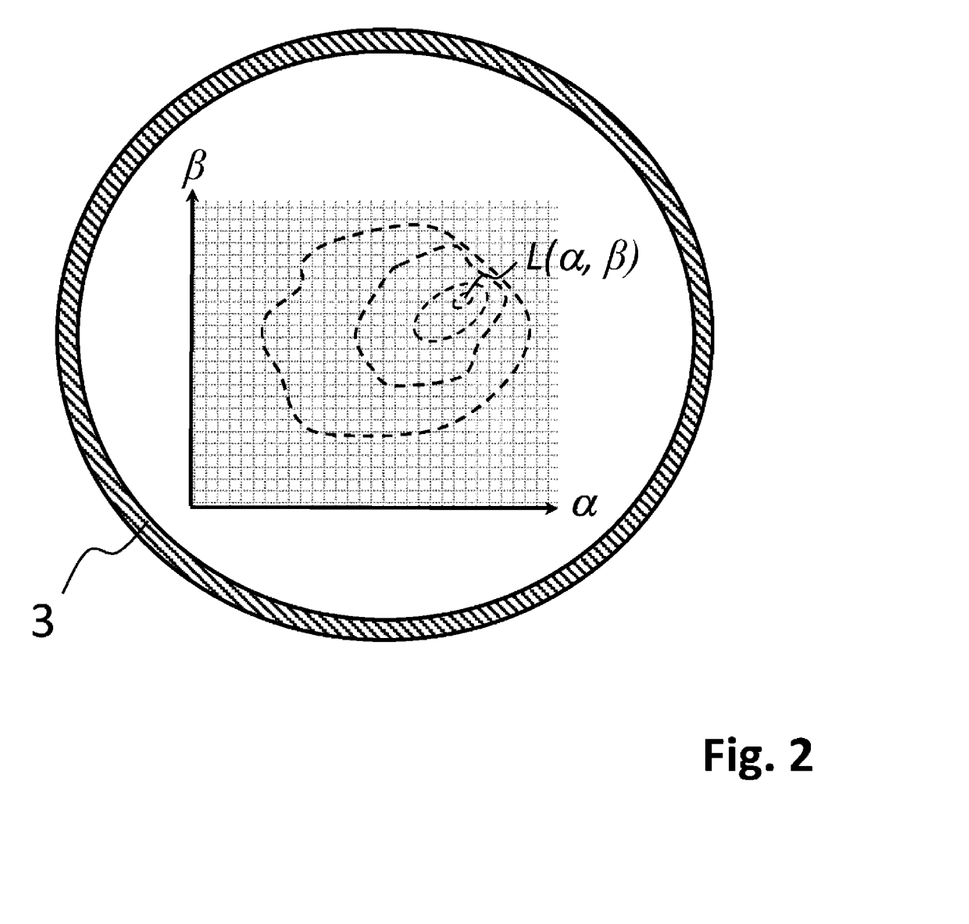
FIG. 2 shows a schematic visualization of the detected fill level as a function of the solid angles within the container.

A fill-level profile L(α, β) determined from the perspective of the fill-level measuring device 1 is shown schematically in FIG. 2. In this case, the fill-level profile L(a, p) in relation to the wall of the container 3 is visualized in the form of contour lines. Depending on the design, the fill-level measuring device 1 can thus, for example, present the fill-level profile L(α, β) on a display, for example, in each case currently, as a topographic map with corresponding contour lines. Independently of any visualization of the fill-level profile L(α, β), within the context of the invention this consists of a data matrix in which the fill level value L is stored as a function of the two solid angles α, β. The size of the data matrix derives accordingly from the angular separation and the width of the solid-angle range.

Figure 3:
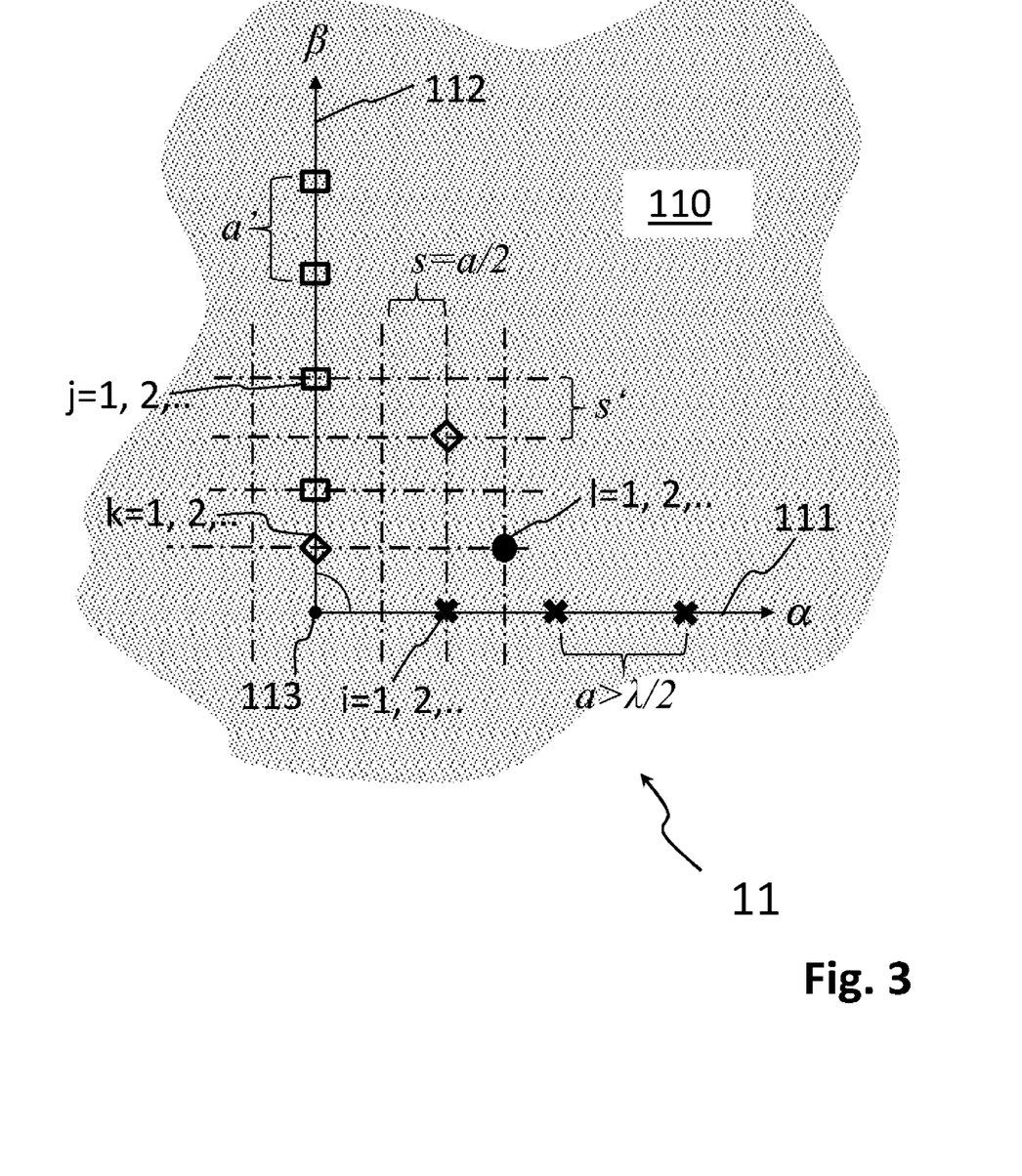
FIG. 3 shows a schematic structure of the antenna assembly of the fill-level measuring device according to the present disclosure.

The design according to the invention and the mode of operation according to the invention of the fill-level measuring device 1 by means of which a fill-level profile L(α, β) can be created with high angular accuracy is explained in more detail with reference to FIG. 3 and FIG. 4:

FIG. 3 shows an antenna assembly 11 according to the invention of the fill-level measuring device 1 in a simplified form. The antenna assembly 11 is based on a main antenna array and in addition a sub-antenna array, wherein the two antenna arrays are arranged on a common substrate 110. The main antenna array and the sub-antenna array thus cover approximately the same solid-angle range [α; β]. So that the solid-angle range [α; β] covers the filling material 2, the entire antenna assembly 11 in the installed state of the fill-level measuring device 1 is aligned in such a way that the normal vector of the substrate 110 and thus the main emission lobes of the antennas i, j, k, l point approximately horizontally towards the filling material 2.

In FIG. 3, for the sake of a simplified illustration, the main antenna array comprises only three transmitting antennas i, each of which is arranged at a defined first separating distance a>λ/2 along a first straight line 111. In this case, the transmitting antennas i of the main antenna array serve to transmit the radar signal $S_{HF}$ in the direction of the filling material 2. The transmitting antennas i of the main antenna array are controlled by a signal generation unit 10 of the fill-level measuring device 1. If FMCW is implemented as the radar method, the transmitting antennas i will be controlled in such a way that they emit the radar signal $S_{HF}$ according to $$f=c*\lambda^{-1}$$

with the sawtooth-modulated frequency f characteristic of FMCW. The signal generation unit can for this purpose be based, for example, on a phase-controlled control loop (also known as PLL, "phase-locked loop"). To implement the MIMO principle, the signal generation unit 10 must in addition feed the radar signal $S_{HF}$ correspondingly encoded to the transmitting antennas i of the main antenna array or in accordance with the TDMA principle of the arrangement sequence i=1, 2, . . . after a time delay.

For receiving the reflected radar signal $R_{HF}$ after reflection at the filling material surface, the main antenna array in the simplified illustration in FIG. 3 comprises four receiving antennas j, which are in turn arranged on a second straight line 112. In this case, the first straight line 111 and the second straight line 112 are arranged at an angle of 90° to one another and have the same origin 114. The receiving antennas j of the main antenna array are also arranged on the second straight line 112 uniformly at a second defined separating distance a' from one another, wherein the second separating distance a' in turn is greater than half of the wavelength A of the radar signal $S_{HF}$. At a frequency f of the radar signal $S_{HF}$, $R_{HF}$ of 100 GHz, the separating distances a, a' between the adjacent transmitting antennas i or the adjacent receiving antennas j according to $$c = \lambda * f$$

correspond to approximately 1.5 mm (c here being the speed of light in vacuum).

As a result of the rectangular arrangement of the two straight lines 111, 112, the three transmitting antennas i and the four receiving antennas j of the main antenna array form a grid [a; a'] with 3*4=12 grid points in the exemplary example of FIG. 3, the grid points reflecting the virtual aperture of the main antenna array according to the MIMO principle. In practice, the main antenna array can comprise in each case 24 transmitting antennas i and 24 receiving antennas j, for example, so that the main antenna array has 24*24 channels for evaluation. In this context, it should be mentioned that a corresponding grid is formed not only at an angle of the two straight lines 111, 112 of 90° to one another, but theoretically at any angle less than 180°. Accordingly, the angle between the two straight lines 111, 112 is not necessarily stipulated within the scope of the invention to be 90°, but can also in practice be between 30° and 150°. However, the resulting solid-angle range [a; β] of the main antenna array is in this case not automatically symmetrical.

Due to the fact that the separating distance a, a' of the transmitting antennas i or the receiving antennas j in the main antenna array is, according to the invention, greater than half the wavelength A of the radar signal $S_{HF}$, a high angular separation of the measured distance or fill-level values can be achieved by means of the main antenna array even when there are only a few transmitting and receiving antennas i, j over the entire angular range. However, not every solid angle α, β can be unambiguously assigned within the solid-angle range [α; β]. According to the invention, this is overcome by means of the sub-antenna array, since by means of this, in the entire solid-angle range [α; β] each solid angle α, β can be unambiguously assigned. For this purpose, the simplified embodiment variant in FIG. 3 comprises two independent receiving antennas k. In relation to the grid [a; a'] of the main antenna array, the receiving antennas k of the sub-antenna array are arranged on an intermediate grid [s; s']. In the context of the invention, each location on the substrate is defined as an intermediate grid [s; s'], which is shifted in the direction of the first straight line 111 by the offset s $$s = \left( \pm \frac{a}{2} \right)$$

or is shifted by an integer multiple thereof from one of the transmitting antennas i or one of the receiving antennas j of the main antenna array, and/or any location, which in turn is shifted in the direction of the second straight line 112 by the offset s'

$$s' = \left( \pm \frac{a'}{2} \right)$$

or is shifted by an integer multiple thereof from one of the receiving antennas j or one of the transmitting antennas i of the main antenna array.

As is described in Eq. 4.21 in "*Array and Phased Array Antenna Basics*" (Hubregt J. Visser, 2005), the offset s, s' between the intermediate grid areas [s; s'] must also be dimensioned according to the following formula $$s, s' \le \frac{\lambda}{\left| \sin\left( \frac{[\alpha; \beta]}{2} \right) \right|}$$

to prevent the sub-antenna array from forming any grating lobes and, accordingly, enable each solid angle α, β to be unambiguously assigned by means of the sub-antenna array in the defined solid-angle range [α; β]. This formula and the positioning of the receiving antennas k of the sub-antenna array required according to the invention are satisfied, for example, if the separating distance a between the transmitting antennas i and the separating distance a' between the receiving antennas j in the main antenna array corresponds to the wavelength A of the radar signal $S_{HF}$, and if the offset s, s' of the transmitting or receiving antennas k, l in the sub-antenna array corresponds to half the wavelength A of the radar signal $S_{HF}$.

In the embodiment variant of the antenna assembly 11 according to the invention shown in FIG. 3 the sub-antenna array comprises, in addition to the two receiving antennas k, an independent transmitting antenna l, which, analogously to the receiving antennas k, is in turn arranged on the intermediate grid [s; s']. Alternatively or in addition to one or more independent transmitting antennas l, it is also conceivable within the meaning of the invention for one or more selected transmitting antennas i and/or receiving antennas j of the main antenna array to be assigned to the sub-antenna array. In this case, these antennas i, j assigned from the main antenna array are also to be selected or positioned, again taking into account the intermediate grid locations [s; s'] of the purely receiving and transmitting antennas k, l of the sub-antenna array, in such a way that by means of the sub-antenna array in the defined solid-angle range [α; β] each solid angle α, β can be uniquely assigned. In this regard, the corresponding number and position of the antennas i, j, k, l of the sub-antenna array can be found or optimized by means of corresponding simulation of the group factor of the sub-antenna array resulting from the antennas i, j, k, l of the sub-antenna array, for example on the basis of MatLab.

Since the required angular separation of the sub-antenna array does not have to be as high as the angular separation of the main antenna array, it suffices within the scope of the invention if the sub-antenna array has only one third of the number of antennas in the main antenna array, irrespective of the embodiment variant shown in FIG. 3. In this way, the fill-level profile L(α, β) can be determined according to the invention with an overall small number of antennas i, j, k, l and correspondingly low computational effort.

Figure 4:
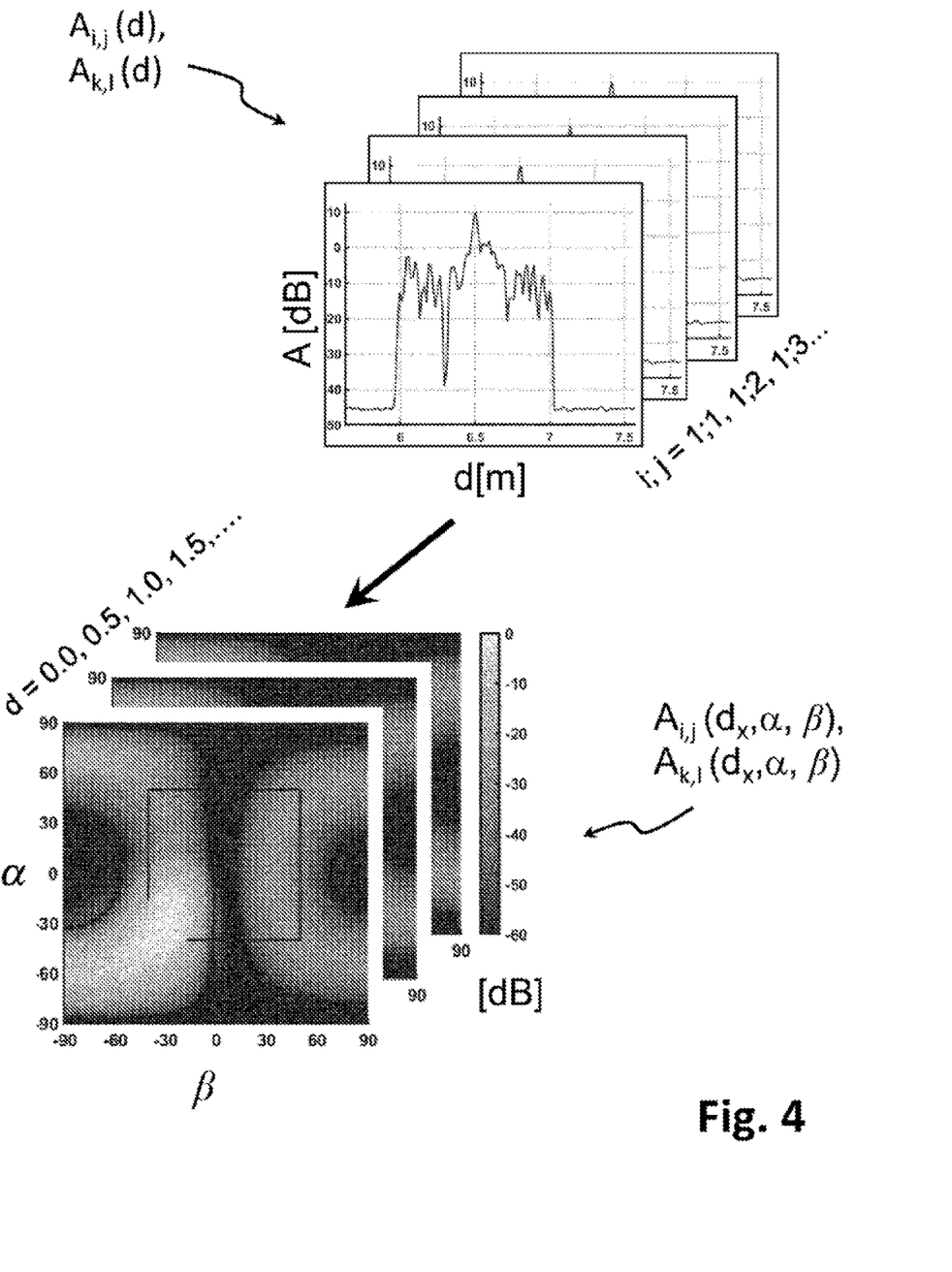
FIG. 4 shows the method according to the invention for determining the solid-angle-dependent fill level by means of the antenna assembly.

How a correspondingly designed evaluation unit 12 of the fill-level measuring device 1 by means of the antenna assembly 11 according to the invention is able to determine the fill-level profile L(α, β) is shown in more detail with reference to FIG. 4: According to the MIMO principle, corresponding measurement curves $A_{i,j}(d)$, $A_{k,l}(d)$ are generated separately for the main antenna array and the sub antenna array on the basis of the received radar signals $R_{HF}$. In the context of the invention, the term "measurement curve" generally represents the signal amplitude A (possibly in dB) of the reflected radar signal $R_{HF}$ as a function of the distance d to the level measuring device 1. In the case of the FMCW principle, the respective measurement curve $A_{i,j}(d)$, $A_{k,l}(d)$ represents the signal amplitude A specifically as a function of the frequency difference between the radar signal $S_{HF}$ outgoing via the respective transmitting antenna i and the radar signal $R_{HF}$ incoming at the respective receiving antenna j, k. Thereby, the frequency difference is in principle linear in relation to the distance d and thus represents the same in the case of FMCW.

Since the activation of the two antenna arrays takes place by means of the MIMO principle, the evaluation unit 12 generates in each case a measurement curve $A_{i,j}(d)$, $A_{k,l}(d)$ for each receiving antenna j of the main antenna array in combination with each transmitting antenna i of the main antenna array, as well as for each receiving antenna k of the main antenna array in combination with each transmitting antenna i of the main antenna array. For the purpose of assigning the transmitting antennas i, l, the signal generation unit 10 controls the transmitting antennas i, l for this purpose in accordance with the TDMA method of the (linear) sequence i, k=1, 2, . . . one after the other, offset in time. As regards the simplified sub-antenna array of the antenna assembly 11 shown in FIG. 3, this control is irrelevant, since the sub-antenna array for the sake of clarity only comprises a single transmitting antenna l. As regards the antenna assembly 11 shown in FIG. 3 this additionally means that 3*4=12 measurement curves $A_{i,j}(d)$ are captured by means of the main antenna array; by means of the sub-antenna array, the evaluation unit accordingly captures 1*2+1*1=3 measurement curves $A_{k,l}(d)$.

On the basis of those measurement curves $A_{i,j}(d)$ captured by means of the main antenna array, the evaluation unit 12 then generates corresponding solid-angle spectra $A_{i,j}(d_x, α, β)$ for defined measurement points $d_x$ of the measurement range d. Likewise, on the basis of those measurement curves $A_{k,l}(d)$ captured by means of the sub-antenna array, additional solid-angle spectra $A_{i,j}(d_x, α, β)$ are created at the level of the respective identical measurement points dx of the measurement range d. Thereby, within the scope of the invention, a "solid-angle spectrum" reproduces two-dimensionally the signal amplitude A or the signal intensity of the reflected radar signal $R_{HF}$ at the level of a defined distance $d_x$ as a function of the two solid angles α, β. The solid-angle spectra $A_{i,j}(d_x, α, β)$, $A_{k,l}(d_x, α, β)$ are created using "digital beamforming." For this purpose, a suitable "digital beamforming processor" architecture can, for example, be implemented within the evaluation unit 12. For the more measurement points $d_x$ solid-angle spectra $A_{i,j}(d_x, α, β)$, $A_{k,l}(d_x, α, β)$ are created, or the closer the measurement points $d_x$ are to each other, the greater will be the potential distance accuracy of the resulting fill-level profile L(α, β).

In order to obtain the fill-level profile L(α, β) the solid-angle spectra $A_{i,j}(d_x, α, β)$, $A_{k,l}(d_x, α, β)$ of the main antenna array and of the sub-antenna array corresponding to the measurement points dx are first combined according to the invention into in each case a conjugated solid-angle spectrum $(d_x, α, β)$. In this case, the evaluation unit 12 combines the solid-angle spectra $A_{i,j}(d_x, α, β)$, $A_{k,l}(d_x, α, β)$ depending on the scaling of the signal amplitude A (linearly or logarithmic) either by addition or multiplication of the amplitude value at the respective solid angle α, β.

The advantage according to the invention is reflected in the conjugated solid-angle spectra $A(d_x, α, β)$, namely the use of a main antenna array and a sub-antenna array: The signal amplitude A of the reflected radar signal $R_{HF}$ can be imaged in the conjugated solid-angle spectra $A(d_x, α, β)$ with a high angular separation over a wide solid-angle range [α, β], despite an overall small number of antennas i, j, k, l or despite fewer required evaluation channels. The evaluation unit 12 can thus also create the fill-level profile L(α, β) over the corresponding solid-angle range [α, β] with high angular separation.

The fill-level profile L(α, β) can be created, for example, on the basis of the resulting conjugated solid-angle spectra $A(d_x, α, β)$ by evaluating for each solid angle α, β at which measuring point $d_x$ of the measuring range d or in which corresponding conjugated solid-angle spectrum $A(d_x, α, β)$ the signal amplitude A is at a maximum. The distance $d_x$ can be converted according to $$d_{(x,max)(α,β)} = h - L(α,β)$$

into the corresponding fill level value L(α, β) if the installation height h of the fill-level measuring device 1 is stored in the evaluation unit 12. Finally, the fill-level profile (L(α, β) can be transmitted to the higher-level unit 4 and/or visualized on a display of the fill-level measuring device 1, for example in the form of contour lines.

The invention claimed is:

1. A radar-based fill-level measuring device that serves to determine a fill-level profile of a filling material over a defined solid-angle range, the fill-level measuring device comprising:
   an antenna assembly, including:
   a main antenna array, including:
      at least two transmitting antennas, arranged along a first straight line, via which a radar signal having a defined wavelength can be transmitted toward the filling material, wherein the at least two transmitting antennas are arranged with respect to one another at a defined first separating distance that is greater than half the defined wavelength of the radar signal; and
      at least two receiving antennas, arranged along a second straight line, via which a radar signal reflected by the filling material surface can be received, wherein the at least two receiving antennas are arranged relative to each other at a second defined separating distance that is greater than half the wavelength of the radar signal, and wherein the second straight line is arranged at a defined angle to the first straight line such that the at least two transmitting antennas and the at least two receiving antennas form a grid; and
   a sub-antenna array having at least two receiving antennas designed to receive the radar signal after reflection at the filling material surface, wherein the at least two receiving antennas of the sub-antenna array are arranged on an intermediate grid in relation to the grid of the main antenna array and at least one transmitting antenna is assigned to the sub-antenna array such that each solid angle can be assigned uniquely by means of the sub-antenna array in the defined solid-angle range;

a signal generation unit designed to generate the radar signal with the defined wavelength and to couple the radar signal into the transmitting antennas of the main antenna array and of the sub-antenna array; and an evaluation unit that is designed to:
- in accordance with the MIMO principle, capture corresponding measurement curves based on the radar signal received at the main antenna array;
- in accordance with the MIMO principle, capture corresponding measurement curves based on the radar signal received at the sub-antenna array;
- in order to create corresponding solid-angle spectra on the basis of measurement curves captured via the main antenna array at the level of defined measuring points of the measurement region,
- in order to create corresponding solid-angle spectra on the basis of the measurement curves captured via the sub-antenna array at the level of the defined measuring points of the measurement region,
- in order to combine the solid-angle spectra, corresponding to the measurement points, of the main antenna array and of the sub-antenna array into conjugated solid-angle spectra, and
- in order to create the solid-angle-dependent fill-level profile on the basis of the conjugated solid-angle spectra.

2. The fill-level measuring device according to claim 1, wherein the at least one assigned transmitting antenna of the sub-antenna array is one of the at least two transmitting antennas of the main antenna array, and/or wherein the sub-antenna array as an associated transmitting antenna includes at least one transmitting antenna arranged on the intermediate grid.

3. A radar-based fill-level measuring device that serves to determine a fill-level profile of a filling material over a defined solid-angle range, the fill-level measuring device comprising:

an antenna assembly, including:
- a main antenna array, including:
  - at least two transmitting antennas, arranged along a first straight line, via which a radar signal having a defined wavelength can be transmitted toward the filling material, wherein the transmitting antennas are arranged with respect to one another at a defined first separating distance that is greater than half the wavelength of the radar signal; and
  - at least two receiving antennas, arranged along a second straight line, via which a radar signal reflected by the filling material surface can be received, wherein the receiving antennas are arranged relative to each other at a second separating distance greater than half the wavelength of the radar signal, and wherein the second straight line is arranged at a defined angle to the first straight line such that the transmitting antennas and the receiving antennas form a grid; and
- a sub-antenna array having at least two transmitting antennas designed to transmit the radar signal to the filling material, wherein the two transmitting antennas of the sub-antenna array are arranged on an intermediate grid with respect to the grid of the main antenna array and at least one receiving antenna is assigned to the sub-antenna array such that via the sub-antenna array each solid angle can be assigned uniquely in the defined solid-angle range;

a signal generation unit designed to generate the radar signal with the defined wavelength and to couple the radar signal into the transmitting antennas of the main antenna array and of the sub-antenna array; and an evaluation unit that is designed to:
- in accordance with the MIMO principle, capture corresponding measurement curves based on the radar signal received at the main antenna array;
- in accordance with the MIMO principle, capture corresponding measurement curves based on the radar signal received at the sub-antenna array;
- in order to create corresponding solid-angle spectra on the basis of measurement curves captured via the main antenna array at the level of defined measuring points of the measurement region,
- in order to create corresponding solid-angle spectra on the basis of the measurement curves captured via the sub-antenna array at the level of the defined measuring points of the measurement region,
- in order to combine the solid-angle spectra, corresponding to the measurement points, of the main antenna array and of the sub-antenna array into conjugated solid-angle spectra, and
- in order to create the solid-angle-dependent fill-level profile on the basis of the conjugated solid-angle spectra.

4. The fill-level measuring device according to claim 3, wherein the signal generation unit is configured to generate the radar signal according to the FMCW method, and wherein the evaluation unit is designed to calculate the measurement curves of the main antenna array and of the sub-antenna array according to the FMCW method.

5. The fill-level measuring device according to claim 4, wherein the evaluation unit is configured to calculate the measurement curves of the main antenna array and of the sub-antenna array via a Hann window or Chebychev window function.

6. The fill-level measuring device according to claim 3, wherein the at least one assigned receiving antenna of the sub-antenna array is one of the receiving antennas of the main antenna array, and/or wherein the sub-antenna array as an assigned receiving antenna comprises at least one receiving antenna arranged on the intermediate grid.

7. The fill-level measuring device according to claim 3, wherein the first straight line and the second straight line are arranged at an angle of 90° to one another.

8. The fill-level measuring device according to claim 3,
wherein the separating distance between the at least two transmitting antennas and the separating distance between the at least two receiving antennas in the main antenna array correspond to the wavelength of the radar signal, and/or
wherein the offset of the transmitting and receiving antennas in the sub-antenna array corresponds to half the wavelength of the radar signal.

9. The fill-level measuring device according to claim 3, wherein the main antenna array has an identical number of transmitting antennas and receiving antennas.

10. The fill-level measuring device according to claim 3, wherein compared to the main antenna array, the sub-antenna array has at most half of the transmitting or receiving antennas.

11. A method for the radar-based determination of a fill-level profile over a defined solid-angle range via a fill-level measuring device, the method comprising:
  providing the fill-level measuring device, including:
    an antenna assembly, including:
      a main antenna array, including:
        at least two transmitting antennas, arranged along a first straight line, via which a radar signal having a defined wavelength can be transmitted toward the filling material, wherein the transmitting antennas are arranged with respect to one another at a defined first separating distance that is greater than half the wavelength of the radar signal; and
        at least two receiving antennas, arranged along a second straight line, via which a radar signal reflected by the filling material surface can be received, wherein the receiving antennas are arranged relative to each other at a second separating distance greater than half the wavelength of the radar signal, and wherein the second straight line is arranged at a defined angle to the first straight line such that the transmitting antennas and the receiving antennas form a grid; and
      a sub-antenna array having at least two transmitting antennas designed to transmit the radar signal to the filling material,
      wherein the two transmitting antennas of the sub-antenna array are arranged on an intermediate grid with respect to the grid of the main antenna array and at least one receiving antenna is assigned to the sub-antenna array such that via the sub-antenna array each solid angle can be assigned uniquely in the defined solid-angle range;
    a signal generation unit designed to generate the radar signal with the defined wavelength and to couple the radar signal into the transmitting antennas of the main antenna array and of the sub-antenna array;
    an evaluation unit that is designed to:
      in accordance with the MIMO principle, capture corresponding measurement curves based on the radar signal received at the main antenna array;
      in accordance with the MIMO principle, capture corresponding measurement curves based on the radar signal received at the sub-antenna array;
      in order to create corresponding solid-angle spectra on the basis of measurement curves captured via the main antenna array at the level of defined measuring points of the measurement region,
      in order to create corresponding solid-angle spectra on the basis of the measurement curves captured via the sub-antenna array at the level of the defined measuring points of the measurement region,
      in order to combine the solid-angle spectra, corresponding to the measurement points, of the main antenna array and of the sub-antenna array into conjugated solid-angle spectra, and
      in order to create the solid-angle-dependent fill-level profile on the basis of the conjugated solid-angle spectra;
  capturing corresponding measurement curves over a defined fill-level measurement range via the main antenna array according to the MIMO principle;
  creating solid-angle spectra at the level of a plurality of defined measuring points of the measurement range on the basis of the measurement curves captured by the main antenna array;
  capturing corresponding measurement curves over a defined fill-level measurement range via the sub-antenna array according to the MIMO principle;
  creating solid-angle spectra at the level of the defined measuring points of the measurement range on the basis of the measurement curves captured by means of the sub-antenna array;
  combining the solid-angle spectra corresponding to the measurement points of the main antenna array and of the sub-antenna array into conjugated solid-angle spectra; and
  creating the solid-angle-dependent fill-level profile on the basis of the conjugated solid-angle spectra.

12. The method according to claim 11, wherein the solid-angle spectra corresponding to the measurement points of the main antenna array and of the sub-antenna array are combined by addition, provided the solid-angle spectra are in each case logarithmically scaled, or
  wherein the solid-angle spectra corresponding to the measuring points of the main antenna array and of the sub-antenna array are combined by multiplication, provided the solid-angle spectra are in each case linearly scaled.

13. The method according to claim 12, wherein the solid-angle spectra are created on the basis of a digital beamforming method.

\* \* \* \* \*